(12) United States Patent
Gao et al.

(10) Patent No.: US 11,973,571 B2
(45) Date of Patent: Apr. 30, 2024

(54) SYSTEMS AND METHODS FOR DETERMINING COMMUNICATION PARAMETERS FOR NON TERRESTRIAL NETWORKS

(71) Applicant: ZTE Corporation, Shenzhen (CN)

(72) Inventors: Yuan Gao, Shenzhen (CN); He Huang, Shenzhen (CN); Xiaojuan Shi, Shenzhen (CN); Li Yang, Shenzhen (CN)

(73) Assignee: ZTE CORPORATION, Guangdong (CN)

(*) Notice: Subject to any disclaimer, the term of this patent is extended or adjusted under 35 U.S.C. 154(b) by 241 days.

(21) Appl. No.: 17/320,773

(22) Filed: May 14, 2021

(65) Prior Publication Data
US 2021/0344413 A1    Nov. 4, 2021

Related U.S. Application Data

(63) Continuation of application No. PCT/CN2018/115392, filed on Nov. 14, 2018.

(51) Int. Cl.
*H04B 7/185* (2006.01)
*H04W 8/22* (2009.01)
*H04W 28/02* (2009.01)

(52) U.S. Cl.
CPC .......... *H04B 7/18513* (2013.01); *H04W 8/22* (2013.01); *H04W 28/0278* (2013.01)

(58) Field of Classification Search
CPC .............. H04B 7/18513; H04B 7/1851; H04B 7/18532; H04W 8/22; H04W 28/0278; H04W 8/24; H04W 24/02
See application file for complete search history.

(56) References Cited

U.S. PATENT DOCUMENTS 6,609,002 B1 * 8/2003 Krishnamurthy ..... H04W 40/12
  455/12.1
7,133,361 B2 * 11/2006 Olariu ..................... H04L 47/27
  370/230

(Continued)

FOREIGN PATENT DOCUMENTS

CA        3048652 A1    7/2018
CN      101162971 A     4/2008

(Continued)

OTHER PUBLICATIONS

Zhu et al., "Performance Modeling of TCP Enhancements in Terrestrial-Satellite Hybrid Networks", Aug. 2006, IEEE/ACM Transactions on Networking, vol. 14, No. 4, pp. 753-766 (Year: 2006).*

(Continued)

*Primary Examiner* — Michael K Phillips
(74) *Attorney, Agent, or Firm* — Crowell & Moring LLP

(57) ABSTRACT

This disclosure relates generally to wireless communications and, more particularly, to systems and methods for determining round trip time and layer 2 (e.g., data link) buffer size in non terrestrial networks. In one embodiment, a method performed by a communication node includes: sending a capability request message to a communication device, wherein the communication node communicates from a satellite in orbit; receiving capability information from the communication device in response to the capability request message; and determining a data link buffer size associated with communications between the communication node and the communication device based on the capability information.

19 Claims, 7 Drawing Sheets

(56) References Cited

U.S. PATENT DOCUMENTS

| | | | | |
|---|---|---|---|---|
| 2006/0285481 | A1* | 12/2006 | Lane | H04L 27/2614 370/208 |
| 2009/0149189 | A1* | 6/2009 | Sammour | H04W 80/02 455/450 |
| 2014/0206367 | A1* | 7/2014 | Agee | H04W 28/0236 455/450 |
| 2014/0355594 | A1* | 12/2014 | Roy | H04L 65/80 370/348 |
| 2016/0037125 | A1* | 2/2016 | Van der Auwera | H04N 7/15 348/14.12 |
| 2017/0371040 | A1* | 12/2017 | Whitefield | G01S 19/22 |
| 2020/0128526 | A1* | 4/2020 | Yang | H04W 72/51 |
| 2020/0288536 | A1* | 9/2020 | Uchino | H04L 1/1819 |
| 2020/0413400 | A1* | 12/2020 | Liu | H04W 72/0446 |
| 2022/0006514 | A1* | 1/2022 | Sedin | H04L 1/1883 |

FOREIGN PATENT DOCUMENTS

| | | | |
|---|---|---|---|
| CN | 101511109 A | * | 8/2009 |
| CN | 103155470 A | | 6/2013 |
| CN | 104322119 A | | 1/2015 |
| EP | 2957121 A1 | | 12/2015 |
| WO | WO 2014/070066 A1 | | 5/2014 |
| WO | WO 2015/114466 A2 | | 8/2015 |
| WO | WO 2015/174790 A1 | | 11/2015 |
| WO | WO-2018031135 A1 | * | 2/2018 |
| WO | WO 2018/119743 A1 | | 7/2018 |

OTHER PUBLICATIONS

Lin et al., "A satellite network service quality assurance method based on mobile agent", Aug. 19, 2009, CN, CN 101511109 English translation (Year: 2009).*

Johnson, "Radio Access Networks for UMTS: Principles and Practice", 2008, John Wiley & Sons, Ltd., ISBN: 978-0-470-72405-7 (Year: 2008).*

Extended European Search Report for European Patent Application No. 18930388.6 dated Nov. 17, 2021, 14 pages.

Huawei et al: "Summary of remaining issues on soft buffer management", 3GPP Draft; R1-1800035, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018 Jan. 13, 2018 (Jan. 13, 2018), XP051384538, Retrieved from the Internet. http://www.3gpp.org/ftp/tsg%5Fran/WG1%5FRL1/TSGR1%5FAH/NR%5FAH%5F1801/Docs/ [retrieved on Jan. 13, 2018].

Intel Corporation (Rapporteur): "Report of email discussion: [100#33][NR] L2 buffer size (Intel)", 3GPP Draft; R2-1800946, 3rd Generation Partnership Project (3GPP), Mobile Competence Centre; 650, Route Des Lucioles; F-06921 Sophia-Antipolis Cedex; France, vol. RAN WG2, No. Vancouver, Canada; Jan. 22, 20180122-Jan. 26, 2018 Jan. 19, 2018 (Jan. 19, 2018), XP051386988, Retrieved from the Internet. http://www.3gpp.org/ftp/tsq%5Fran/WG2%5FRL2/TSGR2%5FAHs/2018%5F01%5FNR/Docs/ [retrieved on Jan. 19, 2018].

Chinese Office Action with English Translation of Chinese Patent Application No. 201880098937.3 dated Jun. 2, 2022, 20 pages.

International Search Report and Written Opinion of the International Searching Authority for International Patent Application No. PCT/CN2018/115392 dated Jul. 26, 2019; 8 pages.

* cited by examiner

US 11,973,571 B2

SYSTEMS AND METHODS FOR DETERMINING COMMUNICATION PARAMETERS FOR NON TERRESTRIAL NETWORKS

CROSS-REFERENCE TO RELATED APPLICATION

This application is a continuation application of PCT International Patent Application No. PCT/CN2018/115392, filed with the China National Intellectual Property Administration, PRC on Nov. 14, 2018, which is herein incorporated by reference in its entirety.

TECHNICAL FIELD

This disclosure relates generally to wireless communications and, more particularly, to systems and methods for determining round trip time and layer 2 (e.g., data link) buffer size in non terrestrial networks.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

Round trip time (RTT) reflects an amount of time that communications are in transition between a transmitter and receiver. Current systems for round trip time indication may be designed for communications within terrestrial networks (e.g., communications between devices on the Earth) and not for non terrestrial networks (e.g., communications between a satellite orbiting the Earth and a device not orbiting the Earth). Therefore, current techniques for round trip time indications may not be entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication node includes: sending a capability request message to a communication device, wherein the communication node communicates from a satellite in orbit; receiving capability information from the communication device in response to the capability request message; and determining a data link buffer size associated with communications between the communication node and the communication device based on the capability information.

In a further embodiment, a method performed by a communication device includes: receiving a capability request message from a communication node, wherein the communication node communicates from a satellite in orbit; sending capability information to the communication node in response to the capability request message, wherein the communication node is configured to determine a data link buffer size associated with communications between the communication node and the communication device based on the capability information.

In a further embodiment, a communication node includes: a transmitter configured to: send a capability request message to a communication device, wherein the communication node communicates from a satellite in orbit; a receiver configured to: receive capability information from the communication device in response to the capability request message; and at least one processor configured to: determine a data link buffer size associated with communications between the communication node and the communication device based on the capability information.

In a further embodiment, a communication device includes: a receiver configured to: receive a capability request message from a communication node, wherein the communication node communicates from a satellite in orbit; and a transmitter configured to: send capability information to the communication node in response to the capability request message, wherein the communication node is configured to determine a data link buffer size associated with communications between the communication node and the communication device based on the capability information.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
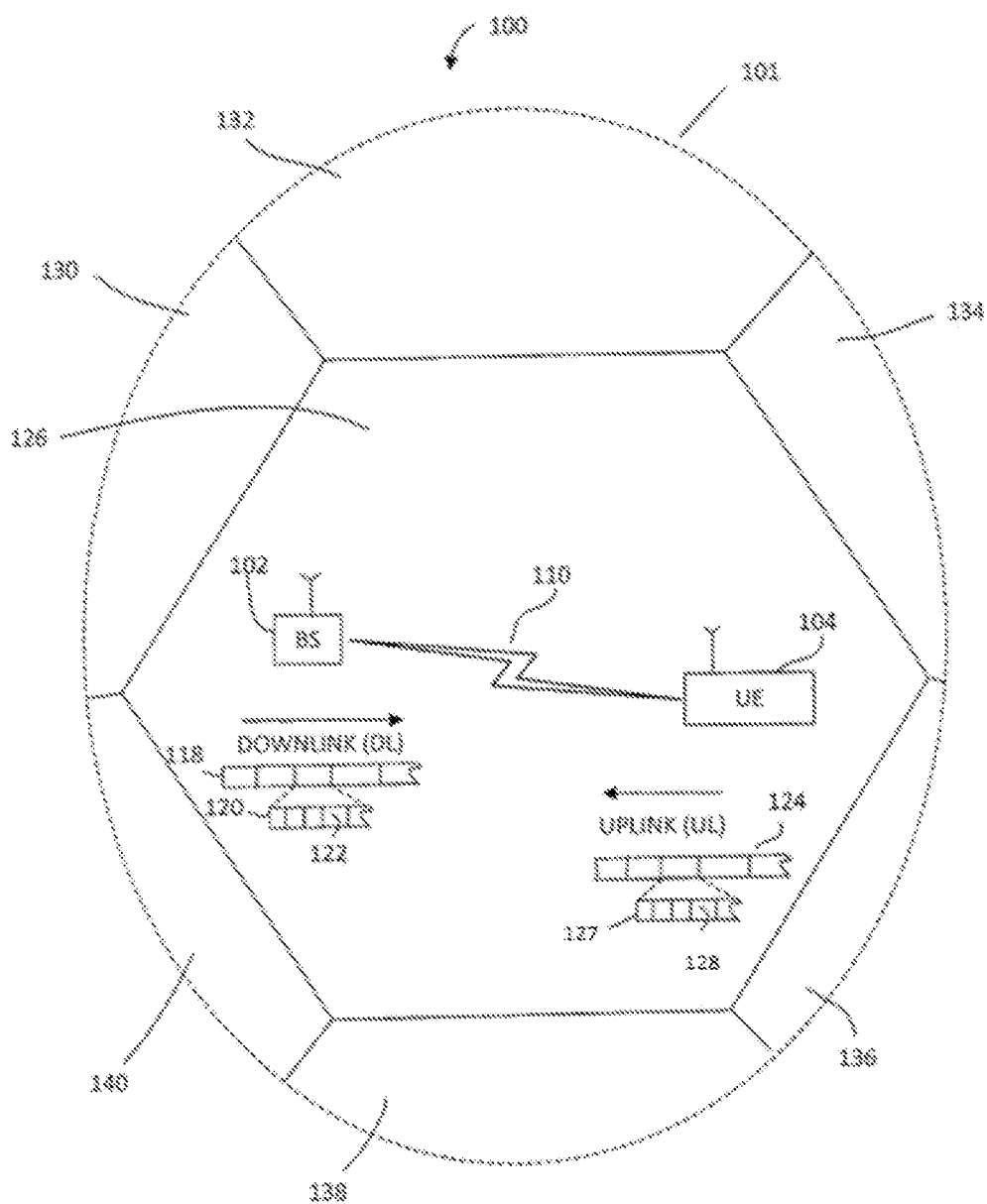
FIG. 1 illustrates an exemplary wireless communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and multiple user equipment devices 104 (hereinafter "UEs 104") that can communicate with each other via respective communication links 110 (e.g., a wireless communication channel), and a cluster of notional cells 126, 130, 132, 134, 136, 138 and 140 overlaying a geographical area with a network 101. Each UE 104 may undergo a random access procedure to join the network 101. In FIG. 1, the BS 102 and each UE 104 are contained within a respective geographic boundary of cell 126. Each of the other cells 130, 132, 134, 136, 138 and 140 may include at least one BS operating at its allocated bandwidth to provide adequate radio coverage to its intended users. Accordingly, reference to a cell may be a short hand reference to a BS with an associated coverage region or area (e.g., cell). In certain embodiments, a cell may be interchangeably referred to as a BS or a node.

For example, the BS 102 may operate at an allocated channel transmission bandwidth (e.g., spectrum) to provide adequate coverage to each UE 104. The spectrum may be regulated to define a licensed range and/or an unlicensed range. The BS 102 and each UE 104 may communicate via a downlink radio frame 118, and an uplink radio frame 124 respectively. The radio frames may also be referred to more simply as a frame. Each frame 118/124 may be further divided into sub-frames 120/127 which may include data symbols 122/128. In the present disclosure, the BS 102 and each UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication device may refer more specifically to a UE in relationship to a BS and a communication node may refer more specifically to a BS in relation to the UE.

In various embodiments, the BS 102 and/or UE 104 may not be a single entity but may be any entity in an uplink (UL)/downlink (DL) counterpart relationship. For example, the BS 102 and/or the UE 104 may be disaggregated such that a BS component that receives the uplink radio frame 124 may not be the same BS component that sends the downlink radio frame 118. Also, the UE component that sends the uplink radio frame 124 may not be the same UE component that receives the downlink radio frame 118.

Figure 2:
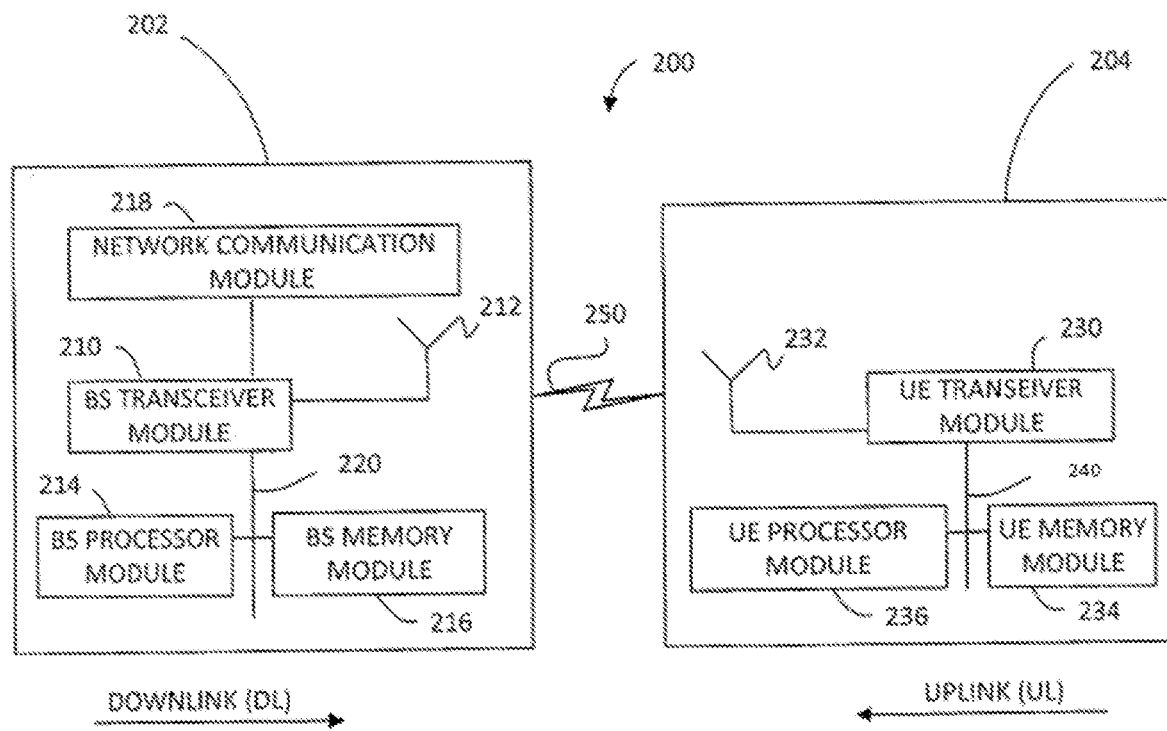
FIG. 2 illustrates a block diagram of an exemplary wireless communication system for transmitting and receiving wireless communication signals in accordance with some embodiments of the invention.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment or network 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be a next generation node B (gNB), a serving gNB, a target gNB a femto station, or a pico station, or a satellite for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

Figure 3A:
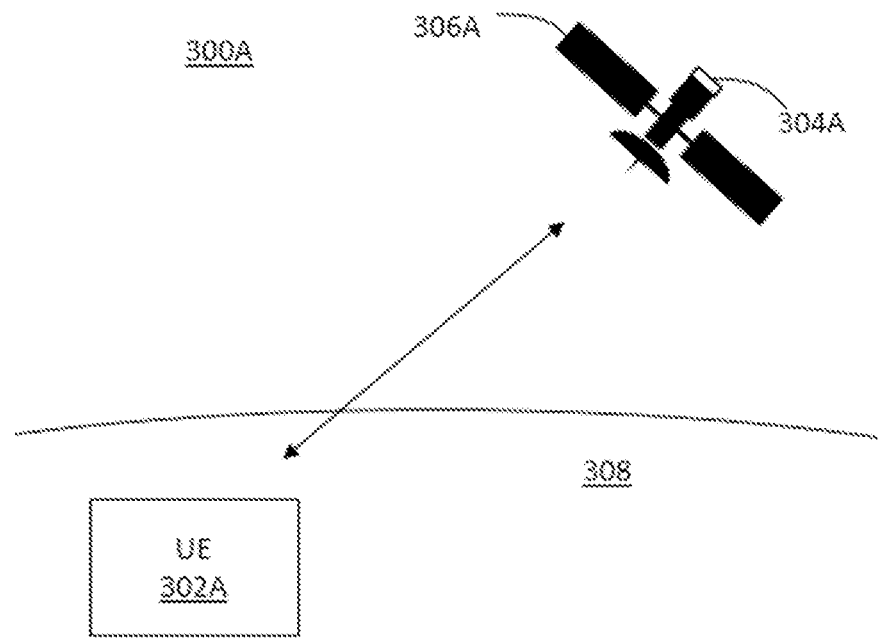
FIG. 3A is a conceptual diagram illustrating a first embodiment of a non terrestrial network, in accordance with some embodiments.

FIG. 3A is a conceptual diagram illustrating a first embodiment of a non terrestrial network (NTN) 300A, in accordance with some embodiments. The non terrestrial network (NTN) 300A may include a UE 302A and a BS 304A, which is on a satellite 306A. The satellite 306A may be in orbit around the Earth 308. Also, the UE 302A may not be in orbit around the Earth 308 and may be relatively stationary when compared with the orbital movement of the satellite 306A.

Figure 3B:
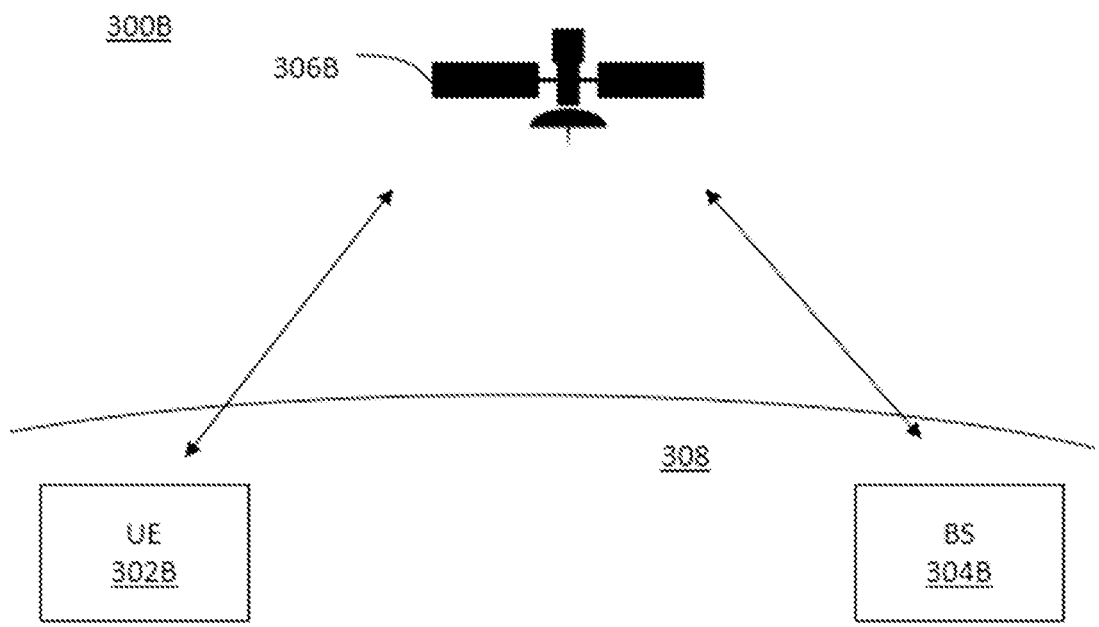
FIG. 3B is a conceptual diagram illustrating a second embodiment of a non terrestrial network, in accordance with some embodiments.

FIG. 3B is a conceptual diagram illustrating a second embodiment of a non terrestrial network (NTN) 300B, in accordance with some embodiments. The non terrestrial network (NTN) 300B may include a UE 302B and a BS 304B that communicate with each other via a satellite 306A. The satellite 306A may be in orbit around the Earth 308. Also, neither the UE 302B nor the BS 304B may not be in orbit around the Earth 308 and may be relatively stationary when compared with the orbital movement of the satellite 306A.

In $5^{th}$ generation new radio (NR) systems, a total layer 2 (e.g., data link layer) buffer size may be defined as a sum of the number of bytes that UE is capable of storing in radio link control (RLC) transmission windows, RLC reception and reordering windows, and also in packet data convergence protocol (PDCP) reordering windows for all radio bearers. For example, the total layer 2 buffer size in a standalone operation (e.g., where one base station (BS) serves a single UE) may be calculated with the following equation (1):

$$\text{Total layer 2 buffer size} = \text{MaxDLDataRate} * \text{RLC RTT} + \text{MaxULDataRate} * \text{RLC RTT} \quad (1)$$

In equation 1, the MaxDLDataRate represents a maximum downlink (DL) data rate, the MaxULDataRate represents a maximum uplink (UL) data rate, and RLC RTT represents a round trip time (RTT). In certain embodiments, the total layer 2 buffer size may be a maximum total layer 2 buffer size based on at least a supported band combination in a NR system (e.g., different bands (e.g., operating bands for communication) from different carriers in a carrier aggregation (CA) system). Furthermore, the RLC round trip time (RTT) for a cell group may correspond to a smallest sub carrier spacing (SCS) numerology supported in a band combination. Exemplary RLC RTTs for a NR cell group of a terrestrial network is provided in Table 1 that relates SCS in kilohertz (KHz) and RTT in milliseconds (MS):

TABLE 1

RLC RTT for NR cell group per SCS

| SCS (KHz) | RLC RTT (ms) |
| --- | --- |
| 15 KHz | 50 |
| 30 KHz | 40 |
| 60 KHz | 30 |
| 120 KHz | 20 |

Figure 3C:
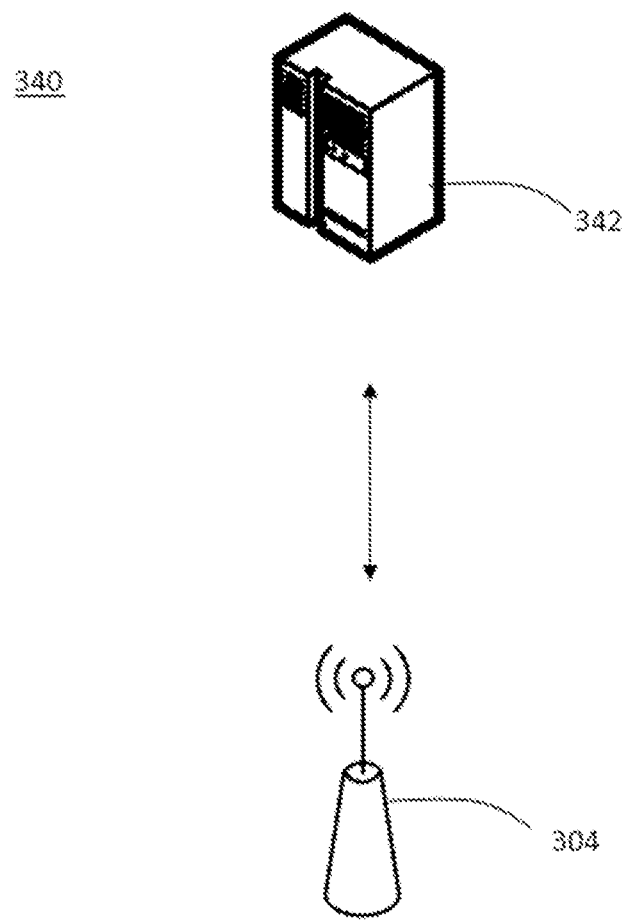
FIG. 3C is a conceptual embodiment illustrating aspects of a non terrestrial network in a stand alone operation, in accordance with some embodiments.

FIG. 3C is a conceptual embodiment illustrating aspects of a non terrestrial network (NTN) 340 in a stand alone operation, in accordance with some embodiments. As part of the stand alone operation, the BS 304 may communicate directly with a core network 342.

Figure 3D:
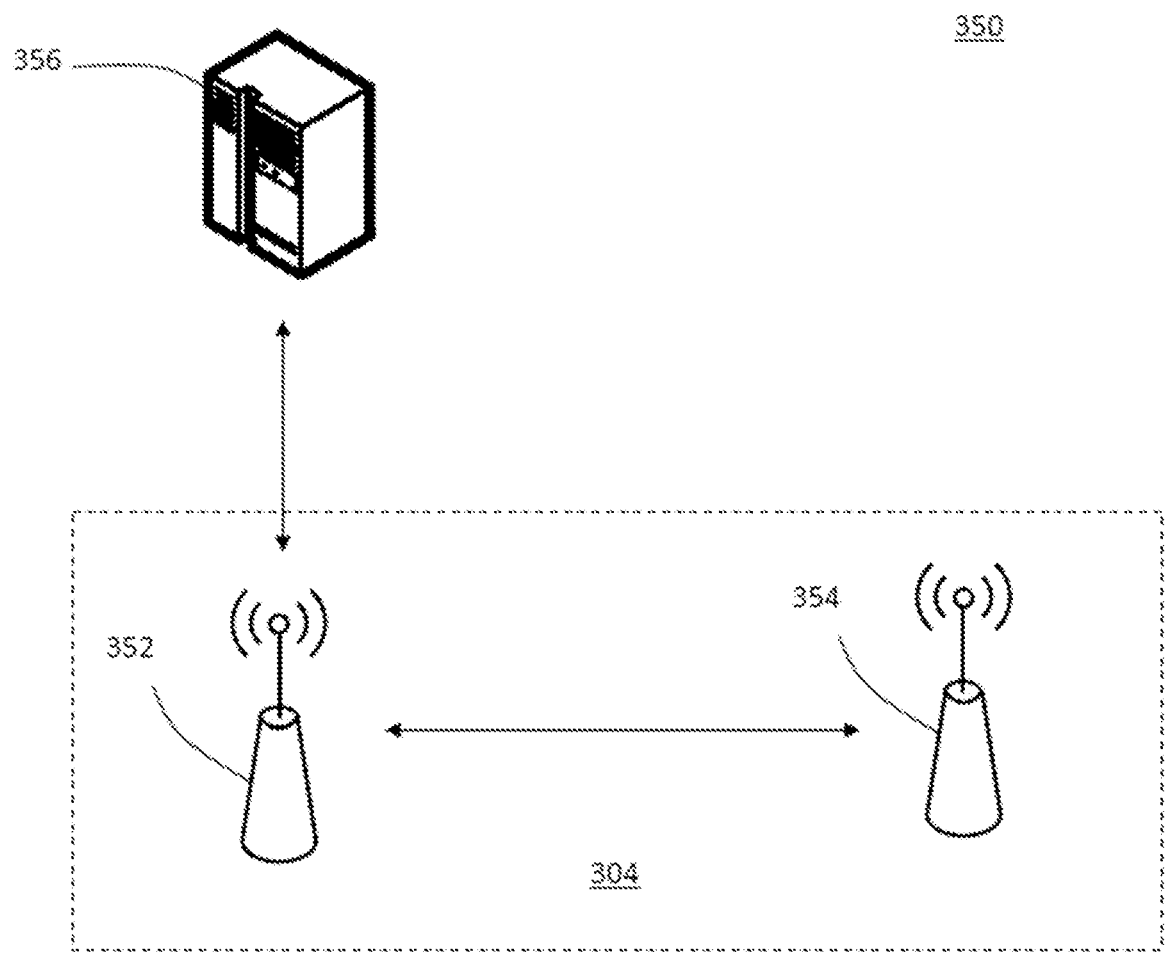
FIG. 3D is a conceptual embodiment illustrating aspects of a non terrestrial network with a master node component and a secondary node component, in accordance with some embodiments.

FIG. 3D is a conceptual embodiment illustrating aspects of a non terrestrial network (NTN) 350 with the BS 304 implemented with a master node component 352 (also referred more simply as a master node, or MN, that may be part of a master cell group (MCG)) a secondary node component 354 (also referred more simply as a secondary node, or SN, that may be part of a secondary cell group (SCG)), in accordance with some embodiments. The BS 304, implemented in a disaggregated manner, may communicate directly with a core network component 356. The core network component 356 may be any component of a core network with which the BS 304 may communicate. For example, the core network component 356 may be an access and mobility management functionality (AMF) or a mobility management entity (MME).

As noted above, the BS 304 may be implemented with multiple components. For example, the BS 304 may include the master node component 352 and the secondary node component 354. Each of the master node component 352 and the secondary node component 354 may communicate with each other as part of the BS 304. Also, the BS 304, and more specifically the master node component 352 of the BS 304, may communicate directly with the core network component 356 (e.g., as the AMF or the MME of the core network).

In certain embodiments, the master node component 352 may be an eNB (e.g., an evolved UTRAN NodeB or E-UTRAN NodeB) while the secondary node component 354 may be a node providing a new radio user plane and control plane protocol terminations towards a UE. In some embodiments, the master node component 352 may be part of a master cell group (MCG) may be associated with an air interface of the $4^{rd}$ generation partnership project (e.g., EUTRA) while the secondary node component 354 that may be part of a secondary cell group (SCG) may be associated with NR. In particular embodiments, the master node component 352 can be an eNB while the secondary node component 354 may be a gNB. In further embodiments, the master node component 352 may be associated with the EUTRA while the secondary node component 354 may be associated with NR. In various embodiments, the master node component 352 and the secondary node component 354 may both be associated with NR.

In a number of embodiments, a total layer 2 buffer size in a multi-RAT dual connectivity (MR-DC) and new radio dual connectivity (NR-DC) situation may be the maximum value of the calculated values based on at least one of the following equations:

Total layer 2 buffer size=MaxULDataRate_MN*RLCRTT_MN+ MaxULDataRate_SN*RLCRTT_SN+ MaxDLDataRate_SN*RLCRTT_SN+MaxDL- DataRate_MN*(RLCRTT_SN+*X2/Xn* delay+ Queuing in SN) (2)

Total layer 2 buffer size=MaxULDataRate_MN*RLCRTT_MN+ MaxULDataRate_SN*RLCRTT_SN+ MaxDLDataRate_MN*RLCRTT_MN+MaxDL- DataRate_SN*(RLCRTT_MN+*X2/Xn* delay+ Queuing in MN) (3)

where: the values for X2/Xn delay+Queuing in SN (e.g., the secondary node component) is 25 ms if the secondary node component is associated with NR and 55 ms if the secondary node component is associated with EUTRA; where the values for X2/Xn delay+Queuing in the MN (e.g., the master node component) is 25 ms if the master node component is associated with NR, and 55 ms if the master node component is associated with EUTRA; the MaxULDataRate_MN is the maximum uplink data rate of the master node component; RLCRTT_MN is the RTT of the master node component; MaxULDataRate_SN is the maximum uplink data rate of the secondary node component; RLCRTT_SN is the RTT of the secondary node component; MaxDLDataRate_SN is the maximum downlink data rate of the secondary node component; and MaxDLDataRate_MN is the maximum downlink data rate of the master node component. Also, the X2 and Xn variables may refer to specific communication interfaces in particular standards or protocols. In certain embodiments, the X2/Xn delay, or more simply recited as X2/Xn, may be referred to more generally as an interface delay (e.g., delay at an X2 or Xn interface), which may further reference an associated scaling factor or offset (e.g., offset value), as will be discussed further below. In particular embodiments, the X2/Xn delay+Queuing may be referred to more generally as a queuing value. This queuing value may be in relation to a master node or a secondary node. Furthermore this queuing value may further reference an associated scaling factor or offset (e.g., offset value), as will be discussed further below.

Furthermore, in NR systems, an approximate data rate for a given number of aggregated carriers in a band or band combination may be determined as follows in equation (4):

$$\text{data rate (in Mbps)} = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)}) \right) \quad (4)$$

In equation 2, J is the number of aggregated component carriers in a band or band combination and $R_{max}$=948/1024. Also, for an arbitrary component carrier (CC) (e.g., for the j-th CC): $v_{Layers}^{(j)}$ is the maximum number of layers; $Q_m^{(j)}$ is the maximum modulation order; $f^{(j)}$ is the scaling factor, where the scaling factor can take the values 1, 0.8, 0.75, and 0.4; $f^{(j)}$ is signaled per band and per band per band combination; is an arbitrary numeric value or numerology; $T_s^\mu$ is the average OFDM symbol duration in a subframe for the numerology $$\mu\left(e.g., T_s^\mu = \frac{10^{-3}}{14.2^\mu}\right),$$

where a normal cyclic prefix is assumed; $NP_{RB}^{BW(j),\mu}$ is the maximum RB allocation in bandwidth $BW^{(j)}$ with numerology $\mu$, where $BW^{(j)}$ is the UE supported maximum bandwidth in the given band or band combination; and $OH^{(j)}$ is an overhead, which takes the following values: 0.14, for an arbitrary frequency range FR1 for downlink (DL), 0.18, for an arbitrary frequency range FR2 for downlink (DL), 0.08, for the arbitrary frequency range FR1 for uplink (UL), and 0.10, for the arbitrary frequency range FR2 for uplink (UL).

As noted above, a non terrestrial network may encompass communications, at least in part, between a device in orbit (e.g., on a satellite) and a device not in orbit. Table 2 describes propagation times for different non geostationary orbit (NGSO) satellite systems:

TABLE 2

Propagation times for different NGSO satellite system types

| | | LEO at 600 km | | LEO at 1500 km | | MEO at 10000 km | |
|---|---|---|---|---|---|---|---|
| Elevation angle | Path | Distance D (km) | Time (ms) | Distance D (km) | Time (ms) | Distance D (km) | Time (ms) |
| UE: 10° | satellite-UE | 1932.24 | 6,440 | 3647.5 | 12,158 | 14018.16 | 46.727 |
| GW: 5° | satellite-gateway | 2329.01 | 7.763 | 4101.6 | 13.672 | 14539.4 | 48.464 |
| 90° | satellite-UE | 600 | 2 | 1500 | 5 | 10000 | 33.333 |
| | | | | Bent pipe satellite | | | |
| One way time | Gateway-satellite_UE | 4261.2 | 14.204 | 7749.2 | 25.83 | 28557.6 | 95.192 |
| Round trip time | Twice | 8522.5 | 28.408 | 15498.4 | 51.661 | 57115.2 | 190.38 |
| | | | | Regenerative satellite | | | |
| One way time | Satellite-UE | 1932.24 | 6.44 | 3647.5 | 12.16 | 14018.16 | 46.73 |
| Round trip time | Satellite-UE-Satellite | 3864.48 | 12.88 | 7295 | 24.32 | 28036.32 | 93.45 |

As noted in Table 2, LEO refers to a low earth orbit (LEO) satellite, MEO refers to a medium earth orbit (MEO) satellite, km refers to kilometers (km), ms refers to milliseconds (ms), and GW refers to a gateway associated with, for example, a 5G NR network. Table 3 describes propagation times for different geostationary orbit (GEO) satellite systems:

TABLE 3

Propagation times for GEO satellite at 35786 km

| | | GEO at 35786 km | |
|---|---|---|---|
| Elevation angle | Path | D (km) | Time (ms) |
| UE :10° | satellite - UE | 40586 | 135.286 |
| GW: 5° | satellite - gateway | 41126.6 | 137.088 |
| 90° | satellite - UE | 35786 | 119.286 |

TABLE 3-continued

Propagation times for GEO satellite at 35786 km

| | | GEO at 35786 km | |
|---|---|---|---|
| Elevation angle | Path | D (km) | Time (ms) |
| | Bent Pipe satellite | | |
| One way time | Gateway-satellite_UE | 81712.6 | 272.375 |
| Round trip time | Twice | 163425.3 | 544.751 |
| | Regenerative Satellite | | |
| One way time | Satellite -UE | 40586 | 135.286 |
| Round trip time | Satellite-UE-Satellite | 81172 | 270.572 |

As described above in Table 2 and Table 3, the RTT of a MEO satellite at 10000 km is up to 93.45 ms, and the RTT rises to 270.572 ms for GEO satellite. Thus, the RTT in non terrestrial networks (NTN) will be larger than that in traditional terrestrial networks or systems, as listed in Table 1. Thus, reference to RTTs within the range of a terrestrial system (e.g., as listed in Table 1), will be insufficient to identify the RTT of NTN systems. Furthermore, RTTs may vary in different satellite systems (e.g. LEO/MEO/GEO) and may change when a subcarrier spacing (SCS) is changed. As noted above, RTT is an important communication parameter used, for example, for layer 2 buffer size calculation.

In addition to RTT, the layer 2 buffer size for dual connectivity operation also depends on the (X2/Xn delay+Queuing in SN) and (X2/Xn delay+Queuing in MN). In NTN, the X2/Xn delay+Queuing in SN/MN will be larger than that in NR.

Accordingly, systems and methods in accordance with various embodiments describe how round trip time (RTT) may be indicated in non terrestrial networks (NTNs). As noted above, RTT is an important communication parameter used, for example, for layer 2 buffer size calculation. In various embodiments, a parameter setting may be provided from the UE to the BS. This parameter setting may provide sufficient information to the BS to ascertain a RTT for communication with the UE. In certain embodiments, the BS may also chose a SCS value that, in conjunction with the parameter setting, may be utilized by the BS to ascertain the RTT. This parameter setting may be a numerical value or setting for communication. For example, the parameter setting may be any of: a supported one or more RTTs (e.g., a maximum RTT or a RTT for different bands), supported satellite system types, supported satellite system identifiers (IDs), and/or supported bands. By being supported, a parameter setting may be utilized for communications with the UE. In certain embodiments, the SCS supported for each band may indicated to the BS (e.g., a BS associated with a network) via a UECapabilityInformation message. Then, the BS may find the lowest SCS supported by the UE to determine the RTT used in a calculation of a layer 2 buffer size. Accordingly, reference to selecting an SCS may refer to utilizing or identifying the lowest supported SCS supported by a UE to determine RTT, as indicated in the UECapabilityInformation message (e.g., as instructed by the UE).

Figure 4:
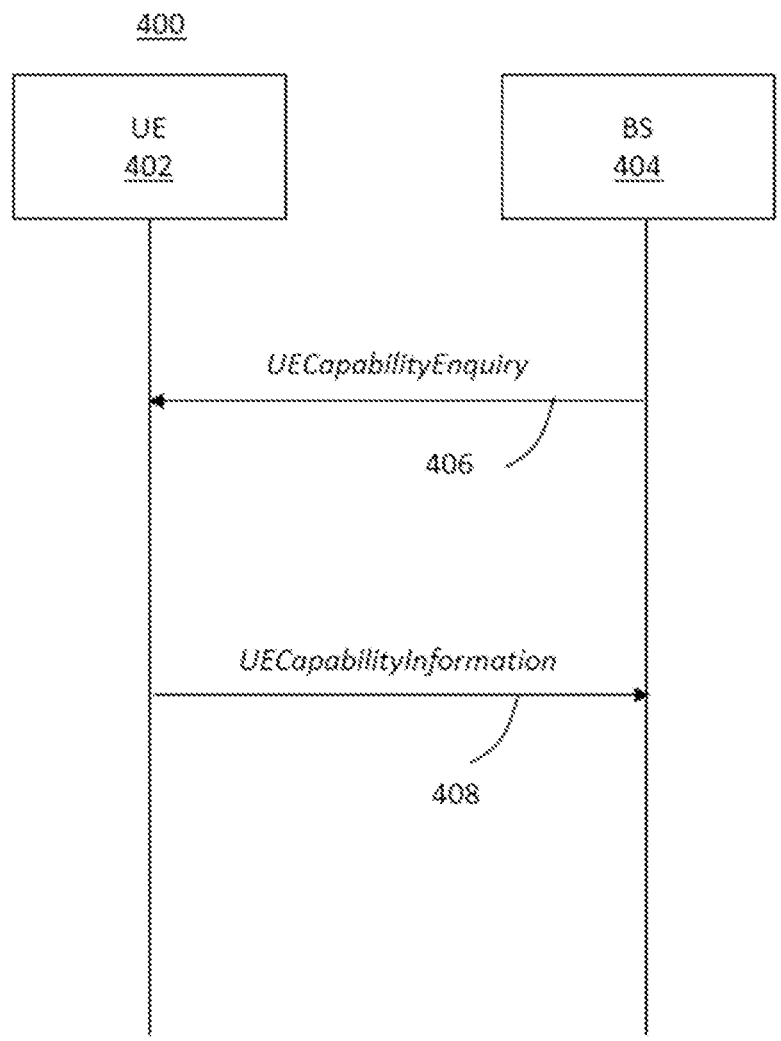
FIG. 4 is a block diagram of a round trip time indication procedure, in accordance with some embodiments.

FIG. 4 is a block diagram of a round trip time indication procedure 400, in accordance with some embodiments. The round trip time indication procedure 400 may be performed between a UE 402, and a BS 404 in a NTN. It is noted that the procedure 400 is merely an example, and is not intended to limit the present disclosure. Accordingly, it is understood that additional operations (e.g., blocks) may be provided before, during, and after the procedure 400 of FIG. 4, certain operations may be omitted, certain operations may be performed concurrently with other operations, and that some other operations may only be briefly described herein.

At operation 406, the BS 404 may initiate the round trip time indication procedure 400 with a UE 402 in a connected state (e.g., RRC_CONNECTED) when the BS requires additional UE radio access capability information. More specifically, the BS 404 may communicate a capability request message (e.g., UECapabiiltyEnquiry) to the UE 402 in the connected state (e.g., RRC_CONNECTED).

At operation 408, the UE 402 may send capability information that includes a parameter setting. This capability information may characterize or identify which communications are supported by the UE 402 (e.g., how the UE 402 may be able to communicate with the BS 404). This capability information may also be sent in response to receiving the capability request message. For example, these parameter settings may characterize a specific value associated with supported communications with the UE 402. As noted above, the parameter setting may be any of: a supported one or more RTTs (e.g., a maximum RTT or a RTT for different bands), supported satellite system types, supported satellite system identifiers (IDs), and/or supported bands.

In particular embodiments, the capability information may be sent in a capability information message (e.g., UECapabilityInformation). This capability information message may be used to transfer UE radio access capabilities requested by the BS 404 or the wider network via the BS 404. In certain embodiments, the UE 402 may store these requested UE radio access capabilities locally for association, for all radio bearers, with RLC transmission windows, RLC reception and reordering windows, and PDCP reordering windows. Accordingly, as will be discussed further below, based on the parameter setting and a supported SCS value indicated by the UE 402, the BS 404 may then determine (e.g., have received or look up) the RTT (e.g., a RTT per band) for communications with the UE 402.

Figure 5A:
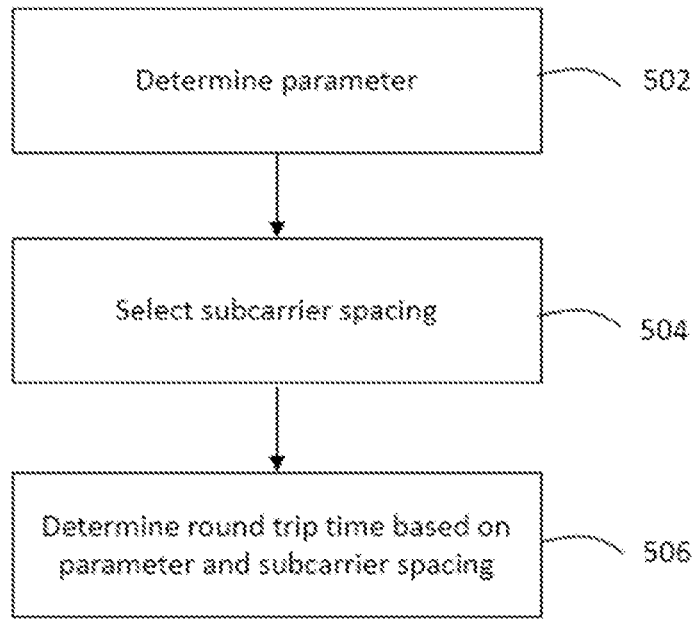
FIG. 5A is a block diagram of a round trip time indication process with subcarrier spacing determination after parameter determination, in accordance with some embodiments.

FIG. 5A is a block diagram of a round trip time indication process 500A with subcarrier spacing determination after parameter determination, in accordance with some embodiments. The process 500A may be performed by a BS in a NTN. It is noted that the process 500A is merely an example, and is not intended to limit the present disclosure. Accordingly, it is understood that additional operations (e.g., blocks) may be provided before, during, and after the process 500A of FIG. 5A, certain operations may be omitted, certain operations may be performed concurrently with other operations, and that some other operations may only be briefly described herein.

At operation 502, the BS may determine a parameter setting from capability information that may characterize or identify which communications are supported by a UE. The capability information may be received in a capability information message (e.g., UECapabilityInformation) from a UE. For example, these parameter settings may characterize a specific value or setting associated with supported communications with the UE 402. As noted above, the parameter setting may be any of: a supported one or more RTTs (e.g., a maximum RTT or a RTT for different bands), supported satellite system types, supported satellite system identifiers (IDs), and/or supported bands.

At operation 504, the BS may select a SCS based on the parameter setting received in operation 502. The SCS may be among a predetermined listing of possible SCS values for the parameter setting received in operation 502. Also, as noted above, the selection may be of the lowest SCS value supported by the UE, as indicated by the UE to the BS.

At operation 506, the BS may determine a RTT based on the selected SCS value and the received parameter setting. In certain embodiments, where the parameter setting includes a number of different RTTs associated with different SCS values, the BS may determine the RTT as the RTT that corresponds to a selected SCS value. In other embodiments, the BS may utilize a predetermined look up table or other data structure to determine the RTT associated with the selected SCS value from the received parameter setting.

Figure 5B:
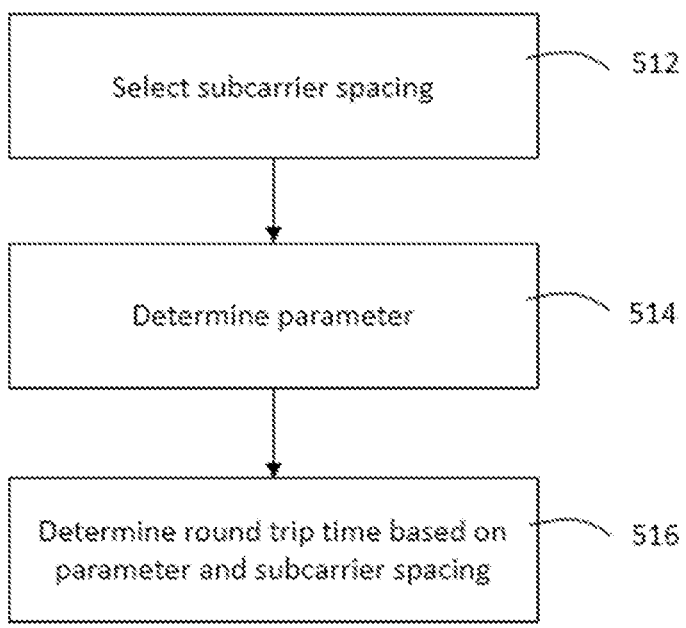
FIG. 5B is a block diagram of a round trip time indication process with subcarrier spacing determination before parameter determination, in accordance with some embodiments.

FIG. 5B is a block diagram of a round trip time indication process 500B with subcarrier spacing determination before parameter determination, in accordance with some embodiments. The process 500B may be performed by a BS in a NTN. It is noted that the process 500B is merely an example, and is not intended to limit the present disclosure. Accordingly, it is understood that additional operations (e.g., blocks) may be provided before, during, and after the process 500B of FIG. 5B, certain operations may be omitted, certain operations may be performed concurrently with other operations, and that some other operations may only be briefly described herein.

At operation 512, the BS may select a SCS for communications. The SCS may be among a predetermined listing of possible SCS values for possible parameter settings that may be subsequently received (e.g., in subsequent operation 514). More specifically, the selection may be of the lowest SCS value supported by the UE, as indicated by the UE to the BS.

At operation 514, the BS may determine a parameter setting from capability information that may characterize or identify which communications are supported by a UE. The capability information may be received in a capability information message (e.g., UECapabilityInformation) from a UE. For example, these parameter settings may characterize a specific value or setting associated with supported communications with the UE 402. As noted above, the parameter setting may be any of: a supported one or more RTTs (e.g., a maximum RTT or a RTT for different bands), supported satellite system types, supported satellite system identifiers (IDs), and/or supported bands.

At operation 516, the BS may determine a RTT based on the selected SCS value and the received parameter setting. In certain embodiments, where the parameter setting includes a number of different RTTs associated with different SCS values, the BS may determine the RTT as the RTT that corresponds to a selected SCS value. In other embodiments, the BS may utilize a predetermined look up table or other data structure to determine the RTT associated with the selected SCS value from the received parameter setting.

In certain exemplary embodiments, the RTT per band for uplink (UL) and downlink (DL) may be included in a FeatureSetUplink and FeatureSetDownlink field separately in the capability information message (e.g., UECapabilny-Information). These fields may also be referred to as an information element (IE). For example, the FeatureSetUplink field may indicate the RTT for an uplink (UL) as, for example, 600 ms, 480 ms, 360 ms, 240 ms, 180 ms, 144 ms, 108 ms, 72 ms, 50 ms, 40 ms, 30 ms, and/or 20 ms. In certain embodiments, multiple RTTs may be indicated with each reflecting a different predetermined SCS or a different predetermined band (e.g., a predetermined NTN operating band) in uplink (UL). RTT for an uplink (UL) may refer to the time from transmission of a signal (e.g., a message or information) from the UE to receipt at the UE of an acknowledgement message indicating receipt of the UE sent signal.

As another example, the FeatureSetDownlink field may indicate the RTT for a downlink (DL) signal as, for example, 600 ms, 480 ms, 360 ms, 240 ms, 180 ms, 144 ms, 108 ms, 72 ms, 50 ms, 40 ms, 30 ms, and/or 20 ms. In certain embodiments, multiple RTTs may be indicated with each reflecting a different predetermined SCS or a different predetermined band (e.g., a predetermined NTN operating band) in downlink (DL). RTT for a downlink (DL) signal may refer to the time from transmission of a signal (e.g., a message or information) from the BS to receipt at the BS of an acknowledgement message indicating receipt of the BS sent signal. Upon receiving the RTT, the BS and/or the wider network may be able to determine information that may be utilized to characterize communications with the UE, such as the layer 2 buffer size discussed above.

In certain exemplary embodiments, the RTT to be used in communications may be included in the capability information message (e.g., UECapabilityInformation). For example, both the BS and the UE may be configured to utilize a predetermined SCS. This predetermined SCS may be selected by the UE and communicated to the BS beforehand. Then, the UE may send, to the BS, the capability information message (e.g., UECapabilityInformation) with the RTT associated with the predetermined SCS (and, optionally, any other criteria or setting supported by the UE). Accordingly, the BS may determine the RTT for use in communications with the UE as the received RTT in the capability information message (e.g., UECapabilityInformation).

For example, an SCS of 15 KHz may be selected by the UE and communicated to the BS. Also, the UE may only supports the GEO satellite system type. Then, the UE may send the appropriate RTT value (e.g., 600 ms) for the predetermined SCS (e.g., 15 KHz) and supported satellite system type (e.g., GEO) to the BS in the capability information message. Also, when the UE may support multiple satellite system types, respective RTT values for each of the satellite system types may be sent to the BS in the capability information message in a predetermined manner.

In certain exemplary embodiments, a maximum RTT is provided to a BS as a parameter setting from a capability information message (e.g., UECapabilityInformation). This maximum RTT may be for example, indicated on a per band or band combination basis. Also, the capability information message may be a dedicated RRC signaling message.

In various embodiments, a relationship between a RTT, SCS, and different satellite system types may be stored at the BS as a look up table. Table 4 provides an example of such a look up table:

TABLE 4

RLC RTT for NTN per SCS

| GEO | | MEO | | LEO | |
| --- | --- | --- | --- | --- | --- |
| SCS (KHz) | RLC RTT (ms) | SCS (KHz) | RLC RTT (ms) | SCS (KHz) | RLC RTT (ms) |
| 15 KHz | 600 | 15 KHz | 180 | 15 KHz | 50 |
| 30 KHz | 480 | 30 KHz | 144 | 30 KHz | 40 |
| 60 KHz | 360 | 60 KHz | 108 | 60 KHz | 30 |
| 120 KHz | 240 | 120 KHz | 72 | 120 KHz | 20 |

In embodiments where a maximum RTT is provided to a BS as a parameter setting from a capability information message, the maximum RTT may be indicative of a particular satellite system type indicated in the look up table. For example, with reference to Table 4, the maximum RTT may be: 600 ms for GEO satellite system, 180 ms for a MEO satellite system, and 50 ms for a LEO satellite system. Upon receiving the maximum RTT supported by the UE as a parameter setting, the BS can then determine the associated satellite system (e.g., whether a GEO, MEO or LEO is associated with the maximum RTT). Then, the BS can determine the RTT from a column of the associated satellite system associated with the row of a desired SCS from the appropriate look up table (e.g., Table 4). In particular embodiments where multiple parameter settings (e.g., multiple maximum RTTs) are provided in capability information and multiple possible RTTs may be selected, the BS may then select a single RTT from the multiple possible RTTs.

In certain exemplary embodiments, a supported satellite system is provided to a BS as a parameter setting from a capability information message (e.g., UECapabilityInformation). This supported satellite system may be for, example, indicated on a per band or band combination basis. Also, the capability information message may be a dedicated RRC signaling message.

As noted above, in certain embodiments a relationship between a RTT, SCS, and different satellite system types may be stored at the BS as a look up table (e.g., Table 4). Thus, once the supported satellite system (e.g., GEO, MEO, or LEO) is provided to the BS as a parameter setting, the BS can then check the corresponding column in an appropriate look up table (e.g., Table 4) and find the RTT according to the row of a desired SCS. In particular embodiments where multiple parameter settings (e.g., multiple supported satellite systems) are provided in capability information and multiple possible RTTs may be selected, the BS may then select a single RTT from the multiple possible RTTs.

In various embodiments, a relationship between a RTT, SCS, and different satellite system identifiers (IDs) may be stored at the BS as a look up table. Table 5 provides an example of such a look up table:

TABLE 5

RLC RTT for NTN per SCS

| Satellite system ID: 1-5 | | Satellite system ID: 6-10 | | Satellite system ID: 11-15 | |
|---|---|---|---|---|---|
| SCS (KHz) | RLC RTT (ms) | SCS (KHz) | RLC RTT (ms) | SCS (KHz) | RLC RTT (ms) |
| 15 KHz | 600 | 15 KHz | 180 | 15 KHz | 50 |
| 30 KHz | 480 | 30 KHz | 144 | 30 KHz | 40 |
| 60 KHz | 360 | 60 KHz | 108 | 60 KHz | 30 |
| 120 KHz | 240 | 120 KHz | 72 | 120 KHz | 20 |

In certain exemplary embodiments, a supported satellite system identifier is provided to a BS as a parameter setting from a capability information message (e.g., UECapabilityInformation). This supported satellite system identifier may be for, example, indicated on a per band or band combination basis. Also, the capability information message may be a dedicated RRC signaling message.

As noted above, in certain embodiments a relationship between a RTT, SCS, and different satellite system identifiers (IDs) may be stored at the BS as a look up table (e.g., Table 5). Thus, once the supported satellite system identifier (e.g., Satellite system identifiers 1-5, 6-10, or 11-15) is provided to the BS as a parameter setting, the BS can then check the corresponding column in an appropriate look up table (e.g., Table 5) and find the RTT according to a row of a desired SCS value. In particular embodiments where multiple parameter settings (e.g., multiple satellite system identifiers) are provided in capability information and multiple possible RTTs may be selected, the BS may then select a single RTT from the multiple possible RTTs.

In certain exemplary embodiments, a supported band or band combination is provided to a BS as a parameter setting from a capability information message (e.g., UECapabilityInformation). The capability information message may be a dedicated RRC signaling message.

In various embodiments, a relationship between a RTT, SCS, and different bands (e.g., NTN operating bands) may be stored at the BS as a look up table. Table 6 provides an example of such a look up table:

TABLE 6

NTN operating bands

| NTN operating band | SCS (KHz) | RLC RTT (ms) |
|---|---|---|
| n100 | 15 KHz | 600 |
| | 30 KHz | 480 |
| | 60 KHz | 360 |
| | 120 KHz | 240 |
| n101 | 15 KHz | 600 |
| | 30 KHz | 480 |
| | 60 KHz | 360 |
| | 120 KHz | 240 |
| ... | | |
| n106 | 15 KHz | 180 |
| | 30 KHz | 144 |
| | 60 KHz | 108 |
| | 120 KHz | 72 |
| n107 | 15 KHz | 180 |
| | 30 KHz | 144 |
| | 60 KHz | 108 |
| | 120 KHz | 72 |
| ... | | |
| n112 | 15 KHz | 50 |
| | 30 KHz | 40 |

TABLE 6-continued

NTN operating bands

| NTN operating band | SCS (KHz) | RLC RTT (ms) |
|---|---|---|
| | 60 KHz | 30 |
| | 120 KHz | 20 |
| n113 | 15 KHz | 50 |
| | 30 KHz | 40 |
| | 60 KHz | 30 |
| | 120 KHz | 20 |
| ... | | |

Thus, once the supported band (e.g., NTN operating band) is provided to the BS as a parameter setting, the BS can then check the corresponding column (e.g., set of rows associated with the supported band) in the appropriate look up table (e.g., Table 6) and find the RTT according to a row of a desired SCS value. In particular embodiments where multiple parameter settings (e.g., as a band combination) are provided in capability information and multiple possible RTTs may be selected, the BS may then select a single RTT from the multiple possible RTTs.

In certain exemplary embodiments, parameter settings may be interrelated such that a first parameter setting may infer a second parameter setting, which may be utilized to determine a SCS value and/or a RTT. For example, a supported band or band combination may be provided to a BS as a parameter setting from a capability information message (e.g., UECapabilityInformation). The capability information message may be a dedicated RRC signaling message. The supported band or band combination may then be used to infer (e.g., look up) a supported satellite system. The supported satellite system may then be used as a parameter setting for RTT determination according to a desired SCS value, as will be discussed below.

In various embodiments, a relationship between different bands (e.g., NTN operating bands) and different satellite systems may be stored at the BS as a look up table. Table 7 provides an example of such a look up table:

TABLE 7

NTN operating bands

| NTN operating band | Satellite system type |
|---|---|
| n100 | GEO |
| n101 | |
| n102 | |
| n103 | |
| n104 | |
| n105 | MEO |
| n106 | |
| n107 | |
| n108 | |
| n109 | |
| n110 | LEO |
| n111 | |
| n112 | |
| n113 | |
| n114 | |

Thus, once the supported band (e.g., NTN operating band) is provided to the BS as a parameter setting, the BS can then check for a corresponding satellite system type in the appropriate look up table (e.g., Table 7). As noted above, in certain embodiments a relationship between a RTT, SCS, and different satellite system types may be stored at the BS as a look up table (e.g., Table 4). Thus, once the supported satellite system type (e.g., GEO, MEO, or LEO) is determined by the BS as a parameter setting, the BS can then check the corresponding column in an appropriate look up table (e.g., Table 4) and find the RTT according to a row of a desired SCS. In particular embodiments where multiple parameter settings (e.g., as a band combination) are provided in capability information and multiple possible RTTs may be selected, the BS may then select a single RTT from the multiple possible RTTs.

In various embodiments, a relationship between different NTN bands (e.g., operating bands) and different satellite system identifiers may be stored at the BS as a look up table. Table 8 provides an example of such a look up table:

TABLE 8

NTN operating bands

| NTN operating band | Satellite system ID |
|---|---|
| n100 | 1 |
| n101 | 2 |
| n102 | 3 |
| n103 | 4 |
| n104 | 5 |
| n105 | 6 |
| n106 | 7 |
| n107 | 8 |
| n108 | 9 |
| n109 | 10 |
| n110 | 11 |
| n111 | 12 |
| n112 | 13 |
| n113 | 14 |
| n114 | 15 |

Thus, once the supported band (e.g., NTN operating band) is provided to the BS as a parameter setting, the BS can then check for a corresponding satellite system identifier in the appropriate look up table (e.g., Table 8). As noted above, in certain embodiments a relationship between a RTT, SCS, and different satellite system identifiers (IDs) may be stored at the BS as a look up table (e.g., Table 5). Thus, once the supported satellite system identifier (e.g., Satellite system identifiers 1-15) is determined by the BS as a parameter setting, the BS can then check the corresponding column in an appropriate look up table (e.g., Table 5) and find the RTT according to a row of a desired SCS value. In particular embodiments where multiple parameter settings (e.g., as a band combination) are provided in capability information and multiple possible RTTs may be selected, the BS may then select a single RTT from the multiple possible RTTs.

In certain exemplary embodiments, a layer 2 buffer size may be determined based on a RTT. As discussed above, RTT may be determined in various ways, such as via indications from a frequency band or frequency band combination. In particular embodiments, the layer 2 buffer size at an NTN may be determined as the maximum value produced by the following equations:

$$\text{Total layer 2 buffer size} = \text{MaxULDataRate\_MN} * \text{RLCRTT}_{NTN\_MN} + \text{MaxULDataRate\_SN} * \text{RLCRTT}_{NTN\_SN} + \text{MaxDLDataRate\_SN} * \text{RLCRTT}_{NTN\_SN} + \text{MaxDLDataRate\_MN} * (\text{RLCRTT}_{NTN\_SN} + X2/Xn \text{ delay} + \text{Queuing in SN}) \quad (5)$$

$$\text{Total layer 2 buffer size} = \text{MaxULDataRate\_MN} * \text{RLCRTT}_{NTN\_MN} + \text{MaxULDataRate\_SN} * \text{RLCRTT}_{NTN\_SN} + \text{MaxDLDataRate\_MN} * \text{RLCRTT}_{NTN\_MN} + \text{MaxDLDataRate\_SN} * (\text{RLCRTT}_{NTN\_MN} + X2/Xn \text{ delay} + \text{Queuing in MN}) \quad (6)$$

In further embodiments, the layer 2 buffer size at an NTN may be determined by at the following equation for stand alone operation:

$$\text{Total layer 2 buffer size} = \text{MaxDLDataRate} * \text{RLC RTT}_{NTN} + \text{MaxULDataRate} * \text{RLC RTT}_{NTN} \quad (7)$$

For equations (5), (6), and (7), the values for X2/Xn delay+Queuing in SN (e.g., the secondary node component) is 25 ms if the secondary node component is associated with NR and 55 ms if the secondary node component is associated with EUTRA; where the values for X2/Xn delay+Queuing in the MN (e.g., the master node component) is 25 ms if the master node component is associated with NR, and 55 ms if the master node component is associated with EUTRA; the MaxULDataRate_MN is the maximum uplink data rate of the master node component; RLCRTT$_{NTN\_MN}$ is the RTT of the master node component in a NTN; MaxULDataRate_SN is the maximum uplink data rate of the secondary node component; RLCRTT$_{NTN\_SN}$ is the RTT of the secondary node component in a NTN; MaxDLDataRate_SN is the maximum downlink data rate of the secondary node component; and MaxDLDataRate_MN is the maximum downlink data rate of the master node component.

In certain exemplary embodiments, RTT scaling factors may be used to calculate a RTT by multiplying a RTT specified in predetermined protocol and the RTT scaling factors (e.g., specific parameters utilized for the determination of RTT). For example, RTT may be looked up using a table in a protocol, such as by using Table 1, noted above. Then, a RTT scaling factor may be provided via dedicated RRC signaling (e.g. via a UECapabilityInformation message) to a BS (e.g., to a network that the BS is part of). In certain embodiments, the RTT in a NTN can be calculated by the following equation:

$$\text{RLCRTT}_{NTN} = \text{RLCRTT} * \text{scaling factor} \quad (8)$$

In equation 8, the RLCRTT$_{NTN}$ may be the RTT in the NTN; the RLCRTT may be the RTT that may be looked up using a table in a protocol; and the scaling factor may be an arbitrary predetermined value for a RTT scaling factor provided via dedicated RRC signaling.

In particular embodiments, the layer 2 buffer size at an NTN may be determined as the maximum value produced by the following equations:

$$\text{Total layer 2 buffer size} = \text{MaxULDataRate\_MN} * \text{RLCRTT}_{NTN\_MN} + \text{MaxULDataRate\_SN} * \text{RLCRTT}_{NTN\_SN} + \text{MaxDLDataRate\_SN} * \text{RLCRTT}_{NTN\_SN} + \text{MaxDLDataRate\_MN} * (\text{RLCRTT}_{NTN\_SN} + X2/Xn \text{ delay} + \text{Queuing in SN}) \quad (9)$$

$$\text{Total layer 2 buffer size} = \text{MaxULDataRate\_MN} * \text{RLCRTT}_{NTN\_MN} + \text{MaxULDataRate\_SN} * \text{RLCRTT}_{NTN\_SN} + \text{MaxDLDataRate\_MN} * \text{RLCRTT}_{NTN\_MN} + \text{MaxDLDataRate\_SN} * (\text{RLCRTT}_{NTN\_MN} + X2/Xn \text{ delay} + \text{Queuing in MN}) \quad (10)$$

In further embodiments, the layer 2 buffer size at an NTN may be determined by at the following equation for stand alone operation:

$$\text{Total layer 2 buffer size} = \text{MaxDLDataRate} * \text{RLC RTT}_{NTN} + \text{MaxULDataRate} * \text{RLC RTT}_{NTN}. \quad (11)$$

For equations (9), (10), and (11), the values for X2/Xn delay+Queuing in SN (e.g., the secondary node component) is 25 ms if the secondary node component is associated with NR and 55 ms if the secondary node component is associated with EUTRA; where the values for X2/Xn delay+Queuing in the MN (e.g., the master node component) is 25 ms if the master node component is associated with NR, and 55 ms if the master node component is associated with EUTRA; the MaxULDataRate_MN is the maximum uplink data rate of the master node component; $RLCRTT_{NTN\_}MN$ is the RTT of the master node component in a NTN; MaxULDataRate_SN is the maximum uplink data rate of the secondary node component; $RLCRTT_{NTN\_}SN$ is the RTT of the secondary node component in a NTN; MaxDLDataRate_SN is the maximum downlink data rate of the secondary node component; and MaxDLDataRate_MN is the maximum downlink data rate of the master node component.

In certain exemplary embodiments, a RTT delay offset (also referred to more simply as a delay offset in short) may be used to calculate the RTT by adding the RTT specified in a predetermined protocol and the RTT offset. For example, RTT may be looked up using a table in a protocol, such as by using Table 1, noted above. Then, a RTT delay offset may be provided via dedicated RRC signaling (e.g. via a UECapabilityInformation message) to a BS (e.g., to a network that the BS is part of). In certain embodiments, the RTT in a NTN can be calculated by the following equation:

$$RLCRTT_{NTN} = RLCRTT + RTT\ \text{offset} \quad (12)$$

In equation 12, the $RLCRTT_{NTN}$ may be the RTT in the NTN; the RLCRTT may be the RTT that may be looked up using a table in a protocol; and the RTT offset may be an arbitrary predetermined value for an RTT delay offset provided via dedicated RRC signaling.

In particular embodiments, the layer 2 buffer size at an NTN may be determined as the maximum value produced by the following equations:

Total layer 2 buffer size=MaxULDataRate_MN*$RLCRTT_{NTN\_}$MN+ MaxULDataRate_SN*$RLCRTT_{NTN\_}$SN+ MaxDLDataRate_SN*$RLCRTT_{NTN\_}$SN+ MaxDLDataRate_MN*($RLCRTT_{NTN\_}$SN+X2/Xn delay+Queuing in SN) (13)

Total layer 2 buffer size=MaxULDataRate_MN*$RLCRTT_{NTN\_}$MN+ MaxULDataRate_SN*$RLCRTT_{NTN\_}$SN+ MaxDLDataRate_MN*$RLCRTT_{NTN\_}$MN+ MaxDLDataRate_SN*($RLCRTT_{NTN\_}$MN+X2/Xn delay+Queuing in MN) (14)

In further embodiments, the layer 2 buffer size at an NTN may be determined by at the following equation for stand alone operation:

Total layer 2 buffer size=MaxDLDataRate*RLC $RTT_{NTN}$+MaxULDataRate*RLC $RTT_{NTN}$ (15)

For equations (13), (14), and (15), the values for X2/Xn delay+Queuing in SN (e.g., the secondary node component) is 25 ms if the secondary node component is associated with NR and 55 ms if the secondary node component is associated with EUTRA; where the values for X2/Xn delay+Queuing in the MN (e.g., the master node component) is 25 ms if the master node component is associated with NR, and 55 ms if the master node component is associated with EUTRA; the MaxULDataRate_MN is the maximum uplink data rate of the master node component; $RLCRTT_{NTN\_}MN$ is the RTT of the master node component in a NTN; MaxULDataRate_SN is the maximum uplink data rate of the secondary node component; $RLCRTT_{NTN\_}$SN is the RTT of the secondary node component in a NTN; MaxDLDataRate_SN is the maximum downlink data rate of the secondary node component; and MaxDLDataRate_MN is the maximum downlink data rate of the master node component.

In certain exemplary embodiments, a RTT may be given explicitly as part of signaling. For example, if the RTT is given explicitly, then the explicit RTT value will be used. Otherwise the value specified for RTT in a protocol will be used. In particular embodiments, this explicit RTT can be given in either an absolute value (e.g. as a value of a particular time unit, such as milliseconds (ms)), or as part of an index that may refer to a value in a pre-defined table as defined in a particular protocol. In various embodiments, a RTT, a RTT delay offset, and/or a RTT scaling factor may be given explicitly in accordance with various alternative expressions. For example, a first alternative expression may be on a per frequency band basis; a second alternative expression may be on a per frequency band combination basis; a third alternative expression may be on a per UE basis; a fourth alternative expression may be on a per RAT (e.g., terrestrial network (TN) or non terrestrial network (NTN)) basis; a fifth alternative expression may be on a per frequency basis (e.g., frequency 1 (FR1), or frequency 2 (e.g., FR2)) basis; a sixth alternative expression may be on a per satellite system basis; a seventh alternative expression may be on a per channel of a particular satellite system basis; and an eighth alternative expression may be on a per SCS basis.

Also, in particular embodiments, these alternative expressions may be combined. For example, a combination of alternative expressions one and eight may be on a per SCS within each band basis. As another example, a combination of alternative expressions six, one, and eight may be on a per each SCS within each band for different satellite systems basis. In particular embodiments, a RTT, a RTT delay offset, and/or a RTT scaling factor may be common for all SCSes.

In certain exemplary embodiments, certain values for X2/Xn delay+Queuing in MN and X2/Xn delay+Queuing in SN in a NTN may be may be implicitly linked to a frequency band or frequency band combination. For example, in an NTN, a value for (X2/Xn delay+Queuing in SN)$_{NTN}$ and (X2/Xn delay+Queuing in MN)$_{NTN}$ may be implicitly linked to a frequency band or frequency band combination. A relationship between (X2/Xn delay+Queuing in SN)$_{NTN}$, (X2/Xn delay+Queuing in MN)$_{NTN}$, SCG type, MCG type and different bands (e.g., NTN operating bands) may be stored at the B S as a look up table. Table 9 provides an example of such a look up table, as follows:

TABLE 9

Look up table

| NTN operating band | MCG | SCG | X2/Xn delay + Queuing in MN(ms) | X2/Xn delay + Queuing in SN(ms) |
|---|---|---|---|---|
| n100 | EUTRA | EUTRA | 55 | 55 |
| n101 | | | 55 | 55 |
| n102 | | NR | 55 | 25 |
| n103 | | | 55 | 25 |
| n104 | NR | NR | 25 | 25 |
| n105 | | | 25 | 25 |
| n106 | | EUTRA | 25 | 55 |
| n107 | | | 25 | 55 |
| n108 | GEO | GEO | 110 | 110 |
| n109 | | | 110 | 110 |
| n110 | | Non- | 110 | 50 |

TABLE 9-continued

Look up table

| NTN operating band | MCG | SCG | X2/Xn delay + Queuing in MN(ms) | X2/Xn delay + Queuing in SN(ms) |
|---|---|---|---|---|
| n111 | | GEO | 110 | 50 |
| n112 | Non-GEO | GEO | 50 | 110 |
| n113 | GEO | | 50 | 110 |
| n114 | | Non-GEO | 50 | 50 |
| N115 | | GEO | 50 | 50 |

In particular embodiments, the layer 2 buffer size at an NTN may be determined as the maximum value produced by the following equations:

Total layer 2 buffer
size=MaxULDataRate_MN*RLCRTT$_{NTN\_}$MN+
MaxULDataRate_SN*RLCRTT$_{NTN\_}$SN+
MaxDLDataRate_SN*RLCRTT$_{NTN\_}$SN+
MaxDLDataRate_MN*(RLCRTT$_{NTN\_}$SN+(X2/Xn delay+Queuing in SN)$_{NTN}$) (16)

Total layer 2 buffer
size=MaxULDataRate_MN*RLCRTT$_{NTN\_}$MN+
MaxULDataRate_SN*RLCRTT$_{NTN\_}$SN+
MaxDLDataRate_MN*RLCRTT$_{NTN\_}$MN+
MaxDLDataRate_SN*(RLCRTT$_{NTN\_}$MN+(X2/Xn delay+Queuing in MN)$_{NTN}$) (17)

In certain exemplary embodiments, certain scaling factors may be utilized in layer 2 buffer size calculation and will be provided via dedicated RRC signaling (e.g. via a UECapabilityInformation message) to a BS (e.g., to a network). In certain embodiments, these scaling factors may be determined in a protocol. For example, a X2/Xn delay+Queuing in SN is 25 ms if a secondary node component (e.g., as associated with a SCG) is associated with NR, and 55 ms if the secondary node component (e.g., as associated with the SCG) is associated with EUTRA. As another example, a X2/Xn delay+Queuing in MN=25 ms if a master node component (e.g., as associated with a MCG) is associated with NR, and 55 ms if the master node component (e.g., as associated with the MCG) is associated with EUTRA.

In various embodiments, scaling factors associated with X2/Xn delay+Queuing in MN and X2/Xn delay+Queuing in SN will be provided via dedicated RRC signaling (e.g. via a UECapabilityInformation message) to a BS (e.g., to a BS associated with a network). For example, in a NTN, the X2/Xn delay+Queuing in MN and X2/Xn delay+Queuing in SN can be calculated by the following equations:

(X2/Xn delay+Queuing in SN)$_{NTN}$=(X2/Xn delay+Queuing in SN)*delay_scaling factor (18)

(X2/Xn delay+Queuing in MN)$_{NTN}$=(X2/Xn delay+Queuing in MN)*delay_scaling factor (19)

In equations (18) and (19), the (X2/Xn delay+Queuing in SN)$_{NTN}$ refers to an NTN implementation of the X2/Xn delay+Queuing in SN; delay_scaling factor refers to a scaling factor provided via dedicated RRC signaling; and the (X2/Xn delay+Queuing in MN)$_{NTN}$ refers to an NTN implementation of the X2/Xn delay+Queuing in MN.

In particular embodiments, the layer 2 buffer size at an NTN may be determined as the maximum value produced by the following equations:

Total layer 2 buffer
size=MaxULDataRate_MN*RLCRTT$_{NTN\_}$MN+
MaxULDataRate_SN*RLCRTT$_{NTN\_}$SN+
MaxDLDataRate_SN*RLCRTT$_{NTN\_}$SN+
MaxDLDataRate_MN*(RLCRTT$_{NTN\_}$SN+(X2/Xn delay+Queuing in SN)$_{NTN}$) (20)

Total layer 2 buffer
size=MaxULDataRate_MN*RLCRTT$_{NTN\_}$MN+
MaxULDataRate_SN*RLCRTT$_{NTN\_}$SN+
MaxDLDataRate_MN*RLCRTT$_{NTN\_}$MN+
MaxDLDataRate_SN*(RLCRTT$_{NTN\_}$MN+(X2/Xn delay+Queuing in MN)$_{NTN}$) (21)

In certain exemplary embodiments, a delay offset used to calculate the X2/Xn delay+Queuing in MN and X2/Xn delay+Queuing in SN by adding the X2/Xn delay+Queuing in MN and X2/Xn delay+Queuing in SN may be specified in a protocol. For example, a X2/Xn delay+Queuing in SN is 25 ms if a secondary node component (e.g., as associated with a SCG) is associated with NR, and 55 ms if the secondary node component (e.g., as associated with the SCG) is associated with EUTRA. As another example, a X2/Xn delay+Queuing in MN is 25 ms if a master node component (e.g., as associated with a MCG) is associated with NR, and 55 ms if the master node component (e.g., as associated with the MCG) is associated with EUTRA.

In various embodiments, a delay offset associated with X2/Xn delay+Queuing in MN and X2/Xn delay+Queuing in SN will be provided via dedicated RRC signaling (e.g. via a UECapabilityInformation message) to a BS (e.g., to a BS associated with a network). For example, in a NTN, the X2/Xn delay+Queuing in MN and X2/Xn delay+Queuing in SN can be calculated by the following equations:

(X2/Xn delay+Queuing in SN)$_{NTN}$=X2/Xn delay+Queuing in SN+delay_offset (22)

(X2/Xn delay+Queuing in MN)$_{NTN}$=X2/Xn delay+Queuing in MN+delay_offset (23)

In equations (22) and (23), delay_offset refers to a delay offset value provided via dedicated RRC signaling.

In particular embodiments, the layer 2 buffer size at an NTN may be determined as the maximum value produced by the following equations:

Total layer 2 buffer
size=MaxULDataRate_MN*RLCRTT$_{NTN\_}$MN+
MaxULDataRate_SN*RLCRTT$_{NTN\_}$SN+
MaxDLDataRate_SN*RLCRTT$_{NTN\_}$SN+
MaxDLDataRate_MN*(RLCRTT$_{NTN\_}$SN+(X2/Xn delay+Queuing in SN)$_{NTN}$) (24)

Total layer 2 buffer
size=MaxULDataRate_MN*RLCRTT$_{NTN\_}$MN+
MaxULDataRate_SN*RLCRTT$_{NTN\_}$SN+
MaxDLDataRate_MN*RLCRTT$_{NTN\_}$MN+
MaxDLDataRate_SN*(RLCRTT$_{NTN\_}$MN+(X2/Xn delay+Queuing in MN)$_{NTN}$) (25)

In further embodiments, the layer 2 buffer size at an NTN may be determined by at the following equation for stand alone operation:

Total layer 2 buffer size=MaxDLDataRate*RLC RTT$_{NTN}$+MaxULDataRate*RLC RTT$_{NTN}$ (26)

In certain exemplary embodiments, the X2/Xn delay+Queuing in MN and X2/Xn delay+Queuing in SN in NTN is given explicitly. More specifically, the X2/Xn delay+Queuing in MN and X2/Xn delay+Queuing in SN may be given explicitly as part of signaling (e.g. if the X2/Xn delay+Queuing in MN and X2/Xn delay+Queuing in SN is given explicitly, then the explicitly value will be used, otherwise the value specified in a protocol will be used).

In particular embodiments, this explicit X2/Xn delay+Queuing in MN and X2/Xn delay+Queuing in SN in NTN can be given in either an absolute value (e.g. as a value of a particular time unit, such as milliseconds (ms)), or as part of an index that may refer to a value in a pre-defined table as defined in a particular protocol. In various embodiments, a X2/Xn delay+Queuing in MN, X2/Xn delay+Queuing in SN, a RTT, a RTT delay offset, and/or a RTT scaling factor in NTNs may be given explicitly in accordance with an alternative expression. For example, a first alternative expression may be on a per frequency band basis; a second alternative expression may be on a per frequency band combination basis; a third alternative expression may be on a per UE basis; a fourth alternative expression may be on a per RAT (e.g., terrestrial network (TN) or non terrestrial network (NTN)) basis; a fifth alternative expression may be on a per frequency basis (e.g., frequency 1 (FR1), or frequency 2 (e.g., FR2)) basis; a sixth alternative expression may be on a per satellite system basis; a seventh alternative expression may be on a per channel of a particular satellite system basis; and an eighth alternative expression may be on a per SCS basis.

Also, in particular embodiments, these alternative expressions may be combined. For example, a combination of alternative expressions one and eight may be on a per SCS within each band basis. As another example, a combination of alternative expressions six, one, and eight may be on a per each SCS within each band for different satellite systems basis. In particular embodiments, a value for a delay offset may be common for all SCSes.

In certain exemplary embodiments, certain values for X2/Xn delay in a NTN may be may be implicitly linked to a frequency band or frequency band combination. For example, in a NTN, a value for $(X2/Xn\ delay)_{NTN}$ may be implicitly linked to a frequency band or frequency band combination. A relationship between $(X2/Xn\ delay)_{NTN}$, SCG type, MCG type and different bands (e.g., NTN operating bands) may be stored at the B S as a look up table. Table 10 provides an example of such a look up table, as follows:

TABLE 10

Look up table

| NTN operating band | MCG | SCG | X2/Xn delay (ms) |
|---|---|---|---|
| n100 | EUTRA | EUTRA | 40 |
| n101 | | | 40 |
| n102 | | NR | 30 |
| n103 | | | 30 |
| n104 | NR | NR | 20 |
| n105 | | | 20 |
| n106 | | EUTRA | 30 |
| n107 | | | 30 |
| n108 | GEO | GEO | 100 |
| n109 | | | 100 |
| n110 | | Non-GEO | 80 |
| n111 | | | 80 |
| n112 | Non-GEO | GEO | 80 |
| n113 | | | 80 |
| n114 | | Non-GEO | 60 |
| N115 | | GEO | 60 |

In particular embodiments, the layer 2 buffer size at an NTN may be determined as the maximum value produced by the following equations:

$$\text{Total layer 2 buffer size} = \text{MaxULDataRate\_MN} * \text{RLCRTT}_{NTN\_MN} + \text{MaxULDataRate\_SN} * \text{RLCRTT}_{NTN\_SN} + \text{MaxDLDataRate\_SN} * \text{RLCRTT}_{NTN\_SN} +$$

$$\text{MaxDLDataRate\_MN} * (\text{RLCRTT}_{NTN\_SN} + (X2/Xn\ delay)_{NTN} + \text{Queuing in SN}) \quad (27)$$

$$\text{Total layer 2 buffer size} = \text{MaxULDataRate\_MN} * \text{RLCRTT}_{NTN\_MN} + \text{MaxULDataRate\_SN} * \text{RLCRTT}_{NTN\_SN} + \text{MaxDLDataRate\_MN} * \text{RLCRTT}_{NTN\_MN} +$$

$$\text{MaxDLDataRate\_SN} * (\text{RLCRTT}_{NTN\_MN} + (X2/Xn\ delay)_{NTN} + \text{Queuing in MN}) \quad (28)$$

In certain exemplary embodiments, certain scaling factors may be utilized in layer 2 buffer size calculation and will be provided via dedicated RRC signaling (e.g. via a UECapabilityInformation message) to a BS (e.g., to a network). In certain embodiments, these scaling factors may be determined in a protocol. For example, a X2/Xn delay is 40 ms if a master node component (e.g., as associated with the MCG) is associated with EUTRA while the secondary node component (e.g., as associated with a SCG) is associated with EUTRA, and 30 ms if a master node component (e.g., as associated with the MCG) is associated with EUTRA while the secondary node component (e.g., as associated with a SCG) is associated with NR. As another example, a X2/Xn delay is 20 ms if a master node component (e.g., as associated with the MCG) is associated with NR while the secondary node component (e.g., as associated with a SCG) is associated with NR, and 30 ms if a master node component (e.g., as associated with the MCG) is associated with NR while the secondary node component (e.g., as associated with a SCG) is associated with EUTRA.

In various embodiments, scaling factors associated with X2/Xn delay will be provided via dedicated RRC signaling (e.g. via a UECapabilityInformation message) to a BS (e.g., to a BS associated with a network). For example, in a NTN, the X2/Xn delay can be calculated by the following equations:

$$(X2/Xn\ delay)_{NTN} = X2/Xn\ delay * \text{delay\_scaling factor} \quad (29)$$

In equations (29), the $(X2/Xn\ delay)_{NTN}$ refers to an NTN implementation of the X2/Xn delay; delay_scaling factor refers to a scaling factor provided via dedicated RRC signaling.

In particular embodiments, the layer 2 buffer size at an NTN may be determined as the maximum value produced by the following equations:

$$\text{Total layer 2 buffer size} = \text{MaxULDataRate\_MN} * \text{RLCRTT}_{NTN\_MN} + \text{MaxULDataRate\_SN} * \text{RLCRTT}_{NTN\_SN} + \text{MaxDLDataRate\_SN} * \text{RLCRTT}_{NTN\_SN} +$$

$$\text{MaxDLDataRate\_MN} * (\text{RLCRTT}_{NTN\_SN} + (X2/Xn\ delay)_{NTN} + \text{Queuing in SN}) \quad (30)$$

$$\text{Total layer 2 buffer size} = \text{MaxULDataRate\_MN} * \text{RLCRTT}_{NTN\_MN} + \text{MaxULDataRate\_SN} * \text{RLCRTT}_{NTN\_SN} + \text{MaxDLDataRate\_MN} * \text{RLCRTT}_{NTN\_MN} +$$

$$\text{MaxDLDataRate\_SN} * (\text{RLCRTT}_{NTN\_MN} + (X2/Xn\ delay)_{NTN} + \text{Queuing in MN}) \quad (31)$$

In certain exemplary embodiments, a delay offset used to calculate the NTN X2/Xn delay by adding the X2/Xn delay may be specified in a protocol. For example, a X2/Xn delay is 40 ms if a master node component (e.g., as associated with the MCG) is associated with EUTRA while the secondary node component (e.g., as associated with a SCG) is associated with EUTRA, and 30 ms if a master node component (e.g., as associated with the MCG) is associated with EUTRA while the secondary node component (e.g., as associated with a SCG) is associated with NR. As another example, a X2/Xn delay is 20 ms if a master node component (e.g., as associated with the MCG) is associated with NR while the secondary node component (e.g., as associated with a SCG) is associated with NR, and 30 ms if a master node component (e.g., as associated with the MCG) is associated with NR while the secondary node component (e.g., as associated with a SCG) is associated with EUTRA.

In various embodiments, a delay offset associated with X2/Xn delay will be provided via dedicated RRC signaling (e.g. via a UECapabilityInformation message) to a BS (e.g., to a BS associated with a network). For example, in a NTN, the X2/Xn delay can be calculated by the following equations:

$$(X2/Xn\ \text{delay})_{NTN} = X2/Xn\ \text{delay} + \text{delay\_offset} \quad (32)$$

In equation (32), delay_offset refers to a delay offset value provided via dedicated RRC signaling.

In particular embodiments, the layer 2 buffer size at an NTN may be determined as the maximum value produced by the following equations:

Total layer 2 buffer size=MaxULDataRate_MN*RLCRTT$_{NTN}$_MN+ MaxULDataRate_SN*RLCRTT$_{NTN}$_SN+ MaxDLDataRate_SN*RLCRTT$_{NTN}$_SN+ MaxDLDataRate_MN*(RLCRTT$_{NTN}$_SN+(X2/Xn delay)$_{NTN}$+Queuing in SN) (33)

Total layer 2 buffer size=MaxULDataRate_MN*RLCRTT$_{NTN}$_MN+ MaxULDataRate_SN*RLCRTT$_{NTN}$_SN+ MaxDLDataRate_MN*RLCRTT$_{NTN}$_MN+ MaxDLDataRate_SN*(RLCRTT$_{NTN}$_MN+(X2/Xn delay)$_{NTN}$+Queuing in MN) (34)

In further embodiments, the layer 2 buffer size at an NTN may be determined by at the following equation for stand alone operation:

Total layer 2 buffer size=MaxDLDataRate*RLC RTT$_{NTN}$+MaxULDataRate*RLC RTT$_{NTN}$ (35)

In certain exemplary embodiments, the X2/Xn delay in NTN is given explicitly. More specifically, the X2/Xn delay may be given explicitly as part of signaling (e.g. if the X2/Xn delay is given explicitly, then the explicitly value will be used, otherwise the value specified in a protocol will be used).

In particular embodiments, this explicit X2/Xn delay in NTN can be given in either an absolute value (e.g. as a value of a particular time unit, such as milliseconds (ms)), or as part of an index that may refer to a value in a pre-defined table as defined in a particular protocol. In various embodiments, a X2/Xn delay, a RTT, a RTT delay offset, and/or a RTT scaling factor in NTNs may be given explicitly in accordance with an alternative expression. For example, a first alternative expression may be on a per frequency band basis; a second alternative expression may be on a per frequency band combination basis; a third alternative expression may be on a per UE basis; a fourth alternative expression may be on a per RAT (e.g., terrestrial network (TN) or non terrestrial network (NTN)) basis; a fifth alternative expression may be on a per frequency basis (e.g., frequency 1 (FR1), or frequency 2 (e.g., FR2)) basis; a sixth alternative expression may be on a per satellite system basis; a seventh alternative expression may be on a per channel of a particular satellite system basis; and an eighth alternative expression may be on a per SCS basis.

Also, in particular embodiments, these alternative expressions may be combined. For example, a combination of alternative expressions one and eight may be on a per SCS within each band basis. As another example, a combination of alternative expressions six, one, and eight may be on a per each SCS within each band for different satellite systems basis. In particular embodiments, a value for a delay offset may be common for all SCSes.

In certain exemplary embodiments, the layer 2 buffer size may be specified in a specification (e.g., protocol) for each frequency band or frequency band combination.

In certain exemplary embodiments, certain scaling factors may be utilized in layer 2 buffer size calculation by multiplying a theoretical layer 2 buffer size derived by a formula in a protocol and at least one scaling factor. For example, a theoretical layer 2 buffer size may be derived as the maximum value produced by the following equations:

Total layer 2 buffer size=MaxULDataRate_MN*RLCRTT_MN+ MaxULDataRate_SN*RLCRTT_SN+ MaxDLDataRate_SN*RLCRTT_SN+MaxDL-DataRate_MN*(RLCRTT_SN+X2/Xn delay+ Queuing in SN) (36)

Total layer 2 buffer size=MaxULDataRate_MN*RLCRTT_MN+ MaxULDataRate_SN*RLCRTT_SN+ MaxDLDataRate_MN*RLCRTT_MN+MaxDL-DataRate_SN*(RLCRTT_MN+X2/Xn delay+ Queuing in MN) (37)

In further embodiments, the theoretical layer 2 buffer size at an NTN may be determined by at the following equation for stand alone operation:

Total layer 2 buffer size=MaxDLDataRate*RLC RTT+MaxULDataRate*RLC RTT (38)

Also, scaling factors for layer 2 buffer sizes in NTN may be provided via dedicated RRC signaling (e.g. via a UECapabilityInformation message) to a BS (e.g., a BS associated with a network). Accordingly, the layer 2 buffer size (e.g., in NTN) may be determined as the maximum value produced by the following equations:

Total layer 2 buffer size= [MaxULDataRate_MN*RLCRTT_MN+ MaxULDataRate_SN*RLCRTT_SN+ MaxDLDataRate_SN*RLCRTT_SN+ MaxDLDataRate_MN*(RLCRTT_SN+X2/Xn delay+Queuing in SN)]*layer 2 buffer size_scaling factor (39)

Total layer 2 buffer size= [MaxULDataRate_MN*RLCRTT_MN+ MaxULDataRate_SN*RLCRTT_SN+ MaxDLDataRate_MN*RLCRTT_MN+ MaxDLDataRate_SN*(RLCRTT_MN+X2/Xn delay+Queuing in MN)]*layer 2 buffer size_scaling factor (40)

In further embodiments, the layer 2 buffer size at an NTN may be determined by at the following equation for stand alone operation:

Total layer 2 buffer size=[MaxDLDataRate*RLC RTT+MaxULDataRate*RLC RTT]*layer 2 buffer size_scaling factor (41)

In further embodiments, the theoretical layer 2 buffer size may be used in lieu of the layer 2 buffer size_scaling factor.

In certain exemplary embodiments, the offset used to calculate the NTN layer 2 buffer size may be determined by adding a theoretical layer 2 buffer size derived by a formula specified in a protocol (e.g., a specification) and the offset. For example, a theoretical layer 2 buffer size may be derived as the maximum value produced by the following equations:

Total layer 2 buffer size=MaxULDataRate_MN*RLCRTT_MN+ MaxULDataRate_SN*RLCRTT_SN+

$$\begin{aligned}&\text{MaxDLDataRate\_SN*RLCRTT\_SN+MaxDL-}\\&\text{DataRate\_MN*(RLCRTT\_SN}+X2/Xn\text{ delay+}\\&\text{Queuing in SN})\end{aligned} \quad (42)$$

$$\begin{aligned}&\text{Total layer 2 buffer}\\&\text{size=MaxULDataRate\_MN*RLCRTT\_MN+}\\&\text{MaxULDataRate\_SN*RLCRTT\_SN+}\\&\text{MaxDLDataRate\_MN*RLCRTT\_MN+MaxDL-}\\&\text{DataRate\_SN*(RLCRTT\_MN}+X2/Xn\text{ delay+}\\&\text{Queuing in MN})\end{aligned} \quad (43)$$

In further embodiments, the theoretical layer 2 buffer size at an NTN may be determined by at the following equation for stand alone operation:

$$\text{Total layer 2 buffer size=MaxDLDataRate*RLC RTT+MaxULDataRate*RLC RTT} \quad (44)$$

Also, the offset for layer 2 buffer sizes in NTN may be provided via dedicated RRC signaling (e.g. via a UECapabilityInformation message) to a BS (e.g., a BS associated with a network). Accordingly, the layer 2 buffer size (e.g., in NTN) may be determined as the maximum value produced by the following equations:

$$\begin{aligned}&\text{Total layer 2 buffer size=}\\&\quad[\text{MaxULDataRate\_MN*RLCRTT\_MN+}\\&\quad\text{MaxULDataRate\_SN*RLCRTT\_SN+}\\&\quad\text{MaxDLDataRate\_SN*RLCRTT\_SN+}\\&\quad\text{MaxDLDataRate\_MN*(RLCRTT\_SN}+X2/Xn\\&\quad\text{delay+Queuing in SN})]\text{+layer 2 buffer size\_off-}\\&\quad\text{set}\end{aligned} \quad (45)$$

$$\begin{aligned}&\text{Total layer 2 buffer size=}\\&\quad[\text{MaxULDataRate\_MN*RLCRTT\_MN+}\\&\quad\text{MaxULDataRate\_SN*RLCRTT\_SN+}\\&\quad\text{MaxDLDataRate\_MN*RLCRTT\_MN+}\\&\quad\text{MaxDLDataRate\_SN*(RLCRTT\_MN}+X2/Xn\\&\quad\text{delay+Queuing in MN})]\text{+layer 2 buffer size\_off-}\\&\quad\text{set}\end{aligned} \quad (46)$$

In further embodiments, the layer 2 buffer size at an NTN may be determined by at the following equation for stand alone operation:

$$\text{Total layer 2 buffer size=[MaxDLDataRate*RLC RTT+MaxULDataRate*RLC RTT]+layer 2 buffer size\_offset} \quad (47)$$

In further embodiments, the theoretical layer 2 buffer size may be used in lieu of the layer 2 buffer size_offset.

In certain exemplary embodiments, the layer 2 buffer size in NTN is given explicitly. More specifically, the layer 2 buffer size may be given explicitly as part of signaling (e.g. if the layer 2 buffer size is given explicitly, then the explicitly value will be used, otherwise the value specified in a protocol will be used). In particular embodiments, this explicit layer 2 buffer size in NTN can be given in either an absolute value (e.g. as a value of a particular time unit, such as milliseconds (ms)), or as part of an index that may refer to a value in a pre-defined table as defined in a particular protocol. In various embodiments, a layer 2 buffer size and related information (e.g., layer 2 buffer size scaling factors, a layer 2 buffer size offset and layer 2 buffer size itself) may be given explicitly in accordance with an alternative expression. For example, a first alternative expression may be on a per frequency band basis; a second alternative expression may be on a per frequency band combination basis; a third alternative expression may be on a per UE basis; a fourth alternative expression may be on a per RAT (e.g., terrestrial network (TN) or non terrestrial network (NTN)) basis; a fifth alternative expression may be on a per frequency basis (e.g., frequency 1 (FR1), or frequency 2 (e.g., FR2)) basis; a sixth alternative expression may be on a per satellite system basis; a seventh alternative expression may be on a per channel of a particular satellite system basis; and an eighth alternative expression may be on a per SCS basis.

Also, in particular embodiments, these alternative expressions may be combined. For example, a combination of alternative expressions one and eight may be on a per SCS within each band basis. As another example, a combination of alternative expressions six, one, and eight may be on a per each SCS within each band for different satellite systems basis. In particular embodiments, a value for a layer 2 buffer size delay offset may be common for all SCSes.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a communication node, the method comprising:
   sending a capability request message to a communication device, wherein the communication node communicates from a satellite in orbit;
   receiving capability information from the communication device in response to the capability request message, wherein the capability information comprises at least one of: a satellite system type; a satellite system identifier; or a non terrestrial network operating band of the satellite;
   identifying a subcarrier spacing associated with at least one of: the satellite system type; the satellite system identifier; or the non terrestrial network operating band of the satellite;
   determining a round trip time based on the subcarrier spacing and at least one of: the satellite system type; the satellite system identifier; or the non terrestrial network operating band of the satellite;
   determining a data link buffer size associated with communications between the communication node and the communication device based on the round trip time; and
   communicating with the communication device based on the data link buffer size.

2. The method of claim 1, wherein the capability information is based on an expression which is based on at least one of following basis:
   a per frequency band basis;
   a per frequency band combination basis;
   a per UE basis;
   a per radio access technology basis;
   a satellite system basis;
   a channel of the satellite system basis; or
   a subcarrier spacing basis.

3. The method of claim 1, wherein the capability information comprises at least one of: a data link buffer size scaling factor, a data link buffer size offset, and the data link buffer size.

4. The method of claim 1, wherein the capability information comprises at least one of: a maximum data rate, a round trip time, a round trip time scaling factor, and a round trip time offset.

5. The method of claim 4, wherein determining the round trip time comprises determining the round trip time based on:
   the subcarrier spacing;
   one of: the satellite system type, the satellite system identifier, or the non terrestrial network operating band; and one of: the round trip time scaling factor, or the round trip time offset.

6. The method of claim 1, wherein the capability information comprises at least one of: a maximum data rate, a round trip time, an interface delay value, and a queuing value for a master node or a secondary node.

7. The method of claim 6, wherein determining the round trip time comprises determining the round trip time based on:
- the subcarrier spacing;
- one of: the satellite system type, the satellite system identifier, or the non terrestrial network operating band; and
- one of: a round trip time scaling factor, or a round trip time offset.

8. The method of claim 6, further comprising:
determining the interface delay value based on an interface delay scaling factor or an interface delay offset, wherein the interface delay value is the delay via a X2 interface or a Xn interface.

9. The method of claim 6, further comprising:
determining the queuing value based on a queuing value scaling factor or a queuing value offset.

10. A method performed by a communication device, the method comprising:
receiving a capability request message from a communication node, wherein the communication node communicates from a satellite in orbit;
sending capability information to the communication node in response to the capability request message, wherein:
the capability information is usable by the communication node to determine a data link buffer size associated with communications between the communication node and the communication device;
the capability information comprises at least one of: a satellite system type; a satellite system identifier; or a non terrestrial network operating band of the satellite; and
in response to a reception of the capability information, the communication node is triggered to:
identify a subcarrier spacing associated with one of: the satellite system type, the satellite system identifier, or the non terrestrial network operating band of the satellite;
determine a round trip time based on the subcarrier spacing and at least one of: the satellite system type, the satellite system identifier, or the non terrestrial network operating band of the satellite; and
determine the data link buffer size based on the round trip time; and
communicating with the communication node based on the data link buffer size.

11. The method of claim 10, wherein the communication device is stationary.

12. The method of claim 10, wherein the communication device is in a radio resource control connected state.

13. The method of claim 10, wherein the communication node is on the satellite.

14. The method of claim 10, wherein the communication node is not in orbit and utilizes the satellite to communicate with the communication device.

15. A communication node, comprising:
a transmitter configured to:
send a capability request message to a communication device, wherein the communication node communicates from a satellite in orbit;
a receiver configured to:
receive capability information from the communication device in response to the capability request message, wherein the capability information comprises at least one of: a satellite system type; a satellite system identifier; or a non terrestrial network operating band of the satellite; and
at least one processor configured to:
identify a subcarrier spacing associated with one of: the satellite system type; the satellite system identifier; or the non terrestrial network operating band of the satellite;
determine a round trip time based on the subcarrier spacing and at least one of: the satellite system type; the satellite system identifier; or the non terrestrial network operating band of the satellite;
determine a data link buffer size associated with communications between the communication node and the communication device based on the round trip time,
wherein the transmitter is configured to communicate with the communication device based on the data link buffer size.

16. The communication node of claim 15, wherein the capability information is based on an expression which is based on at least one of following basis:
a per frequency band basis;
a per frequency band combination basis;
a per UE basis;
a per radio access technology basis;
a satellite system basis;
a channel of the satellite system basis; or
a subcarrier spacing basis.

17. The communication node of claim 15, wherein the capability information comprises at least one of: a data link buffer size scaling factor, a data link buffer size offset, and the data link buffer size.

18. The communication node of claim 15, wherein the capability information comprises at least one of: a maximum data rate, a round trip time, a round trip time scaling factor, and a round trip time offset.

19. The communication node of claim 18, wherein, when the processor is configured to cause the communication node to determine the round trip time, the processor is configured to cause the communication node to determine the round trip time based on:
the subcarrier spacing;
one of: the satellite system type, the satellite system identifier, or the non terrestrial network operating band; and
one of: the round trip time scaling factor, or the round trip time offset.

* * * * *